F. M. CASE.
TEAKETTLE.
APPLICATION FILED MAR. 15, 1915.
1,338,553.
Patented Apr. 27, 1920.
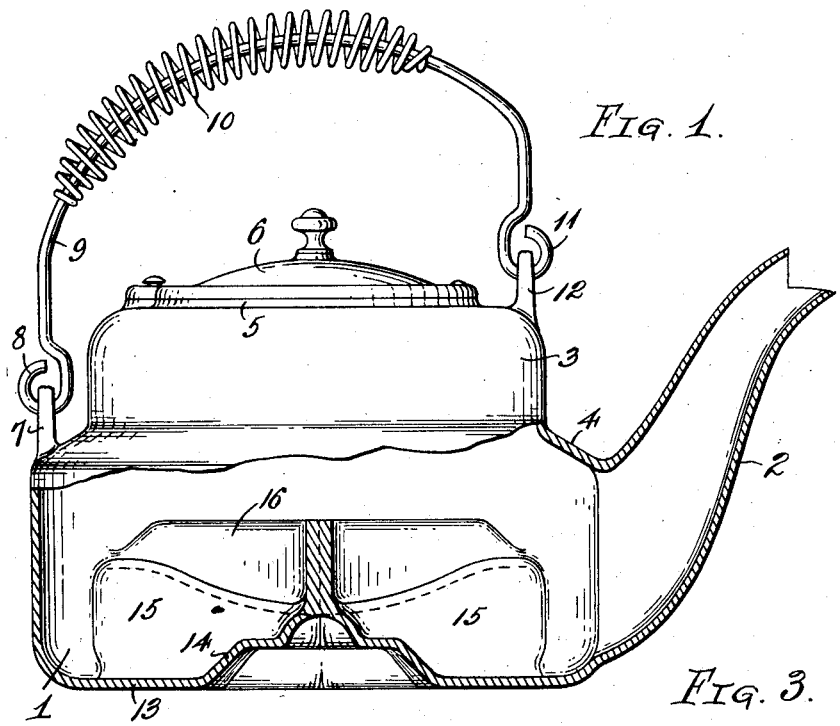
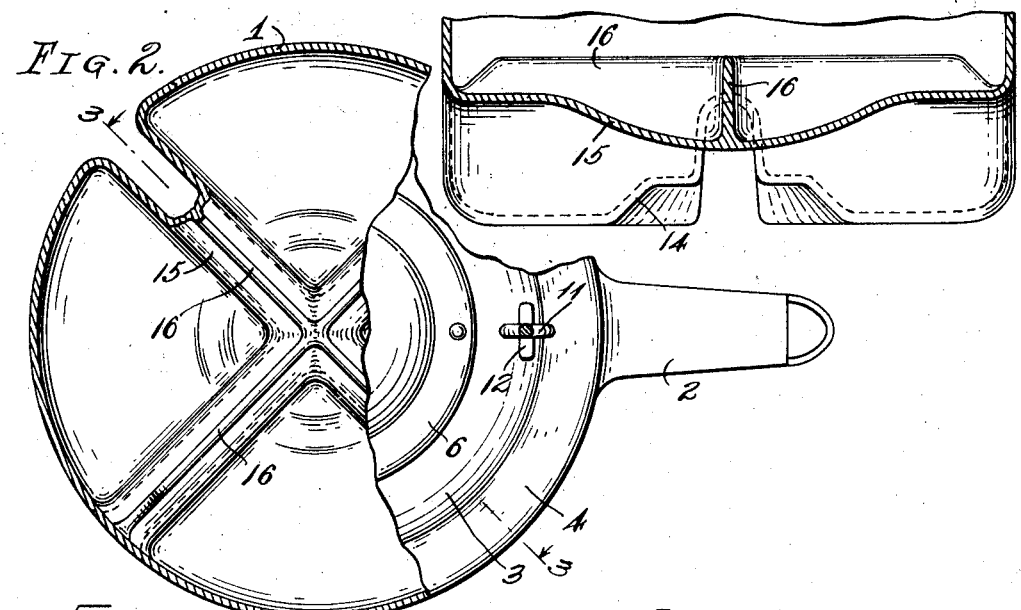

UNITED STATES PATENT OFFICE.

FRANCIS M. CASE, OF CLEVELAND, OHIO.

TEAKETTLE.

1,338,553.

Specification of Letters Patent.  Patented Apr. 27, 1920.

Application filed March 15, 1915. Serial No. 14,353.

*To all whom it may concern:*

Be it known that I, FRANCIS M. CASE, a citizen of the United States, residing at Cleveland, in the county of Cuyahoga and State of Ohio, have invented certain new and useful Improvements in Teakettles, of which the following is a specification.

This invention relates generally to cooking utensils, and particularly to tea kettles. More specifically the invention relates to a tea kettle comprising a shell having a spout and a bottom provided with hollow channel shaped members which enter the confines of the shell and open out through the side wall for the purpose of increasing the heating surface of the utensil.

The invention also relates to a handle arrangement which is such that the force of gravity holds the kettle during all the pouring positions.

The invention may be further briefly summarized as consisting in the construction and combination of parts hereinafter set forth in the following description, drawings and claim.

Referring to the drawings, Figure 1 is a view partly in elevation and partly in section showing the device; Fig. 2 is a view partly in plan and partly in section showing the plan of the hollow ribs; and Fig. 3 is a sectional view of the lower part of the kettle upon a line corresponding to the line 3—3 of Fig. 1.

In carrying out the invention any preferred design of tea kettle may be employed so long as it possesses the necessary characteristics, but I have shown one arrangement which is effective, and in such embodiment the shell comprises a lower shell portion 1 provided with a spout 2 and an upper reduced shell portion 3 connected to the lower portion by an inclined portion 4. This upper reduced portion is provided with the usual lid seat 5 adapted to receive a lid 6. Extending upward from the inclined portion 4 is a handle lug 7 having an opening for receiving the eye 8 of a handle rod 9 provided with the usual grip 10 intermediate its ends. The other end of the handle is provided with an eye 11 engaging in a lug 12 secured at an elevated point with respect to the lug 7 as by arranging this lug 12 upon the upper part of the reduced portion 3, this arrangement being such that in pouring the liquid from the kettle, it will always assume proper position and will not swing about the handle by reason of the fact that the center of gravity is always below the support in all pouring positions.

The main shell portion 1 is provided with a bottom 13 having an upwardly extending dome 14 at the center. This bottom and the main shell portion 1 are provided with radially extending hollow channel shaped members 15 which extend from the central dome 14 out to the periphery, the openings at the ends of these hollow members establishing communication between the dome and the outside of the main shell 1. In order to more effectively transmit the heat from these hollow members in the central dome to the liquid within the kettle, the channel members are provided with upwardly extending ribs 16 which meet at the center and serve to transmit the heat to the liquid.

It will be seen from the foregoing description that when heat is applied under the kettle it will engage the bottom 13, the walls forming the dome, and also the walls of the hollow channel ribs 15, thereby treating a large heating surface.

Having described my invention, I claim:—

A tea kettle, comprising a hollow shell provided with a pouring spout and handle, the bottom of said shell having an upwardly extending central dome, and a series of radially extending inverted channel-shaped members providing a hollow cavity and radiating channels beneath the shell for the distribution of heat, said members having ribs extending upwardly therefrom and connected above said dome to assist in transmitting the heat to the body of liquid in the kettle.

In testimony whereof I affix my signature in presence of two witnesses.

FRANCIS M. CASE.

Witnesses:
G. O. FARQUHARSON,
C. H. SHOTZBARGER.